United States Patent
Morimura

(10) Patent No.: US 6,267,509 B1
(45) Date of Patent: Jul. 31, 2001

(54) WHEEL BEARING DEVICE

(75) Inventor: Naoki Morimura, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/340,719

(22) Filed: Jun. 29, 1999

(30) Foreign Application Priority Data

Jul. 3, 1998 (JP) .................................................. 10-188330

(51) Int. Cl.$^7$ .............................. F16C 32/00; F16C 41/04
(52) U.S. Cl. ............................................. 384/448; 324/174
(58) Field of Search .................................. 384/448, 449, 384/445; 324/173, 174

(56) References Cited

U.S. PATENT DOCUMENTS

| | | | |
|---|---|---|---|
| 5,567,058 | 10/1996 | Morita et al. | 384/448 |
| 5,614,822 | * 3/1997 | Sakamoto et al. | 324/174 |

FOREIGN PATENT DOCUMENTS

| | | |
|---|---|---|
| 61-159202 | 10/1986 | (JP) . |
| 2-50517 | 4/1990 | (JP) . |
| 2-132502 | 11/1990 | (JP) . |
| 4-74729 | 6/1992 | (JP) . |
| 4-74730 | 6/1992 | (JP) . |
| 5-10010 | 2/1993 | (JP) . |
| 6-29903 | 4/1994 | (JP) . |
| 11-23593 | * 11/1997 | (JP) . |
| 9-288117 | * 11/1997 | (JP) . |

OTHER PUBLICATIONS

European Search Report dated Dec. 1, 1999.

* cited by examiner

Primary Examiner—Sherry Estremsky
Assistant Examiner—Tisha D. Lewis
(74) Attorney, Agent, or Firm—McGinn & Gibb, PLLC

(57) ABSTRACT

A pulser ring and a pickup sensor are sealingly housed by a seal so as to prevent the penetration of foreign matters. The pulser ring is fixedly mounted on one end face side of an inner ring that is mounted on a drive shaft side to thereby rotate together therewith. The seal has a resilient material mounted at a distal end of a metal ring, and is fixedly mounted on one end face side of an outer ring fixed to a vehicle body side which one end face side corresponds to the one end face side of the inner ring. The seal encompasses the pulser ring inside thereof. The resilient material of the seal is brought into close and slidable contact with an outer circumferential surface of a drive shaft. The pickup sensor is supported by the metal ring.

19 Claims, 2 Drawing Sheets

WHEEL BEARING DEVICE

BACKGROUND OF THE INVENTION

The present invention relates to a wheel bearing device for an automobile, and more particularly to a wheel bearing device having incorporated therein a mechanism that detects the number of rotations of a wheel of the automobile.

In an automobile equipped with an anti-skid braking system (ABS), it is necessary to detect the number of rotations of the wheels which changes moment by moment. A typical mechanism for detection of the number of rotations of the wheel is made up of a pulser ring having recessed and protruded teeth formed in an outer circumferential surface or a side thereof at a certain pitch, and a pickup sensor disposed so as to confront the recessed and protruded teeth for detection thereof.

A mechanism for detecting the number of rotations of the wheels of an automobile like the one described above is, as seen from a cross-sectional view illustrated in FIG. 2, incorporated in a wheel bearing device. In this example, an inner ring 21 is fixedly mounted to an axle S and acts as a fixed ring, and an outer ring 23, which is made to freely rotate relative to the inner ring 21 via rolling members, is fixedly mounted over a hub (not shown) of a wheel and acts as a rotating ring. In addition, a pulser ring 24 is mounted on the outer ring 23, i.e. the rotating ring, to thereby rotate together with the wheel. A pickup sensor 25 is supported on a fixed portion of the vehicle body via a carrier 26 and placed so as to contact the pulser ring 24.

A sealing member 24a made from rubber or the like is fixedly mounted on a radially innermost circumferential edge of the pulser ring 24, so that the sealing member 24a is brought into abutment with an outer circumferential surface of the inner ring 21 to achieve the sealing of the bearing. In addition, the pulser ring 24 and the pickup sensor 25 are sealed by a labyrinth seal 27 fixedly mounted on the side of the axle S.

In the wheel bearing device a for detecting the number of rotations of the wheel of an automobile as described above, although the seal 27 is mounted on the side of the axle S in an attempt to seal the pulser ring 24 and the pickup sensor 25, a gap G is still formed between the axle S or the seal 27 and each of the pulser ring 24 and the pickup sensor 25, which permits foreign matters to enter into the inside of the seal and adhere to the pulser ring 24 and the pickup sensor 25. This may interfere with the detection of the number of rotations.

SUMMARY OF THE INVENTION

The present invention was made in view of these circumstances, and an object of the invention is to provide a wheel bearing device having a mechanism for detecting the number of rotations of a wheel of an automobile that can securely prevent the adherence of foreign matter to the pulser ring and the pickup sensor, thereby eliminating the threat of interference in the detection of the number of rotations of the wheel.

To fulfill the above object, the present invention provides a wheel bearing device comprising an outer ring fixed to a vehicle body side, and an inner ring that is rotatably supported by the outer ring via rolling bodies and that is mounted on a drive shaft side so as to rotate together therewith. In the device, a pulser ring is fixedly mounted on one end face side of the inner ring, and a seal in which an annular resilient material is mounted at a distal end of a metal ring is fixedly mounted at a proximal end thereof on one end face side of the outer ring which corresponds to the one end face side of the inner ring. The seal is mounted in such a manner that it encompasses the pulser ring and that the resilient material disposed at the distal end of the seal is arranged in tight contact with and slidable relative to an outer circumferential surface of a drive shaft. A pickup sensor is mounted on the metal ring in such a manner as to be opposed to the pulser ring.

To achieve the stated object, the present invention adopts such an arrangement as to sealingly house the pulser ring and the pickup sensor. That is, the pulser ring is fixed to one end face side of the inner ring acting as a rotating ring, while the seal in which a resilient material such as a vulcanized rubber is mounted on the distal end of the metal ring is mounted on the one end face side of the outer ring acting as a fixed ring which one end face side corresponds to the one end face side of the inner ring. The resilient material is arranged in tight contact with and slidable relative to the outer circumferential surface of the drive shaft. The pickup sensor is mounted on the metal ring. This arrangement makes it possible to sealingly house the pulser ring and the pickup sensor on the axle side.

The present disclosure relates to the subject matter contained in Japanese patent application No. Hei. 10-188330 (filed on Jul. 3, 1998), which is expressly incorporated herein by reference in its entirety.

DESCRIPTION OF THE PREFERRED EMBODIMENT

Figure 1:
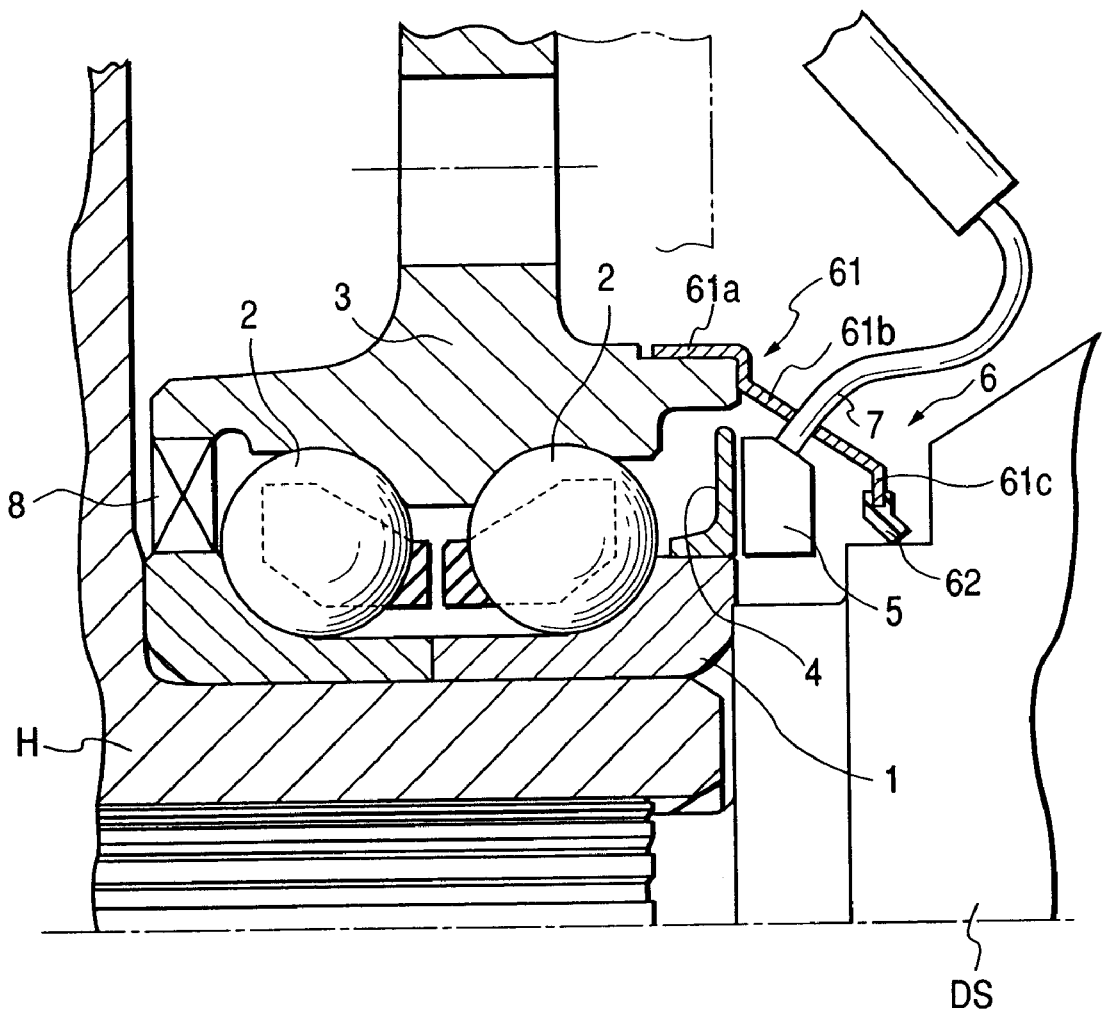
FIG. 1 is a cross-sectional view showing arrangement according to an embodiment of the present invention.
Figure 2:
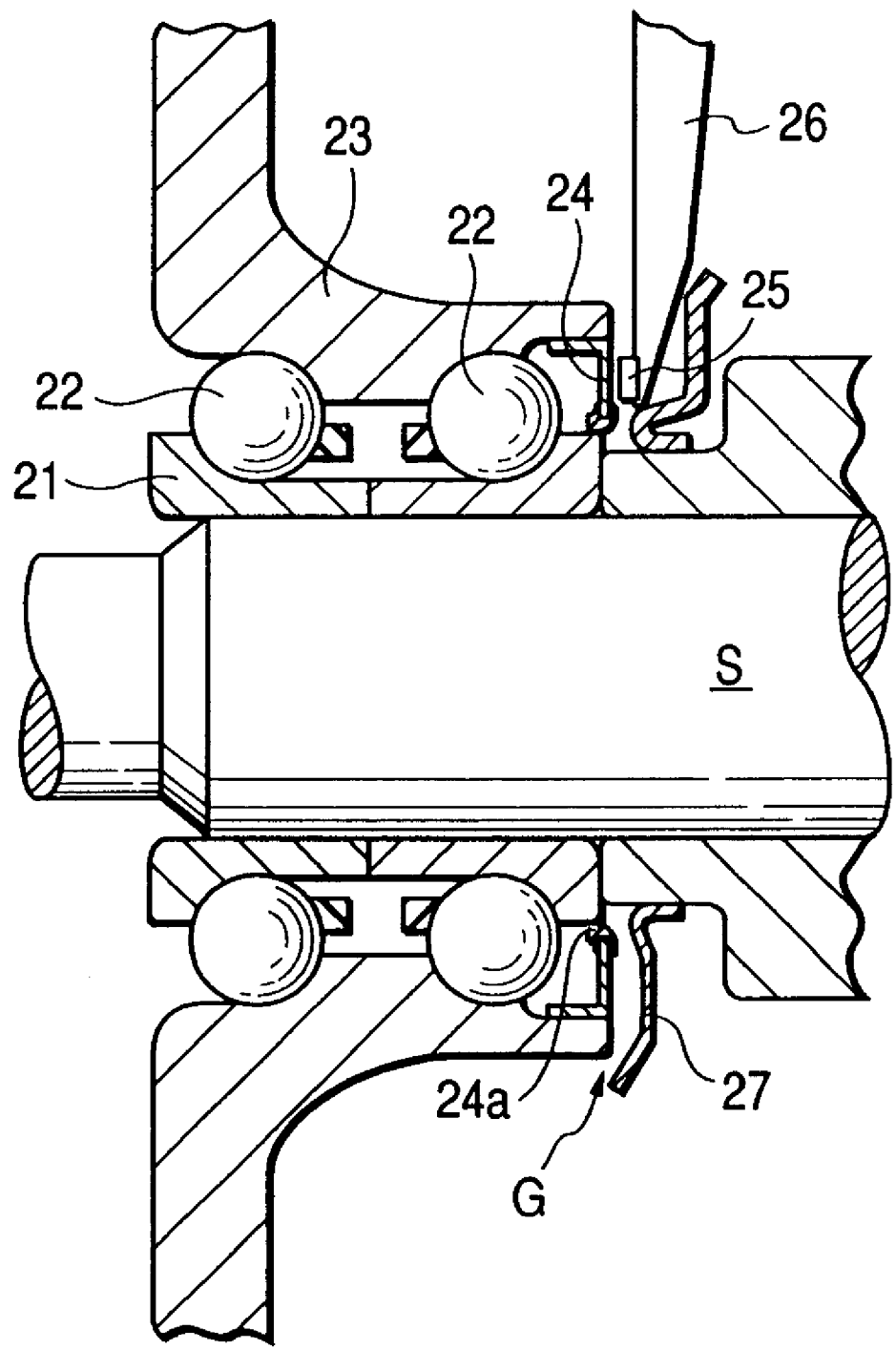
FIG. 2 is a cross-sectional view showing an example of a typical arrangement of a wheel bearing device having incorporated therein a mechanism for detecting the number of rotations of a heel of an automobile.

FIG. 1 is a cross-sectional view of an embodiment of the present invention.

An inner ring 1 is press-fitted and thus fixed to an outer circumference of a shaft portion of a hub H that is integrally mounted on a distal end of a drive shaft DS, so that the inner ring 1 rotates together with the drive shaft DS. An outer ring 3 rotatably supports the inner ring 1 via rolling members 2, and is fixed to a vehicle body side, for instance, to a knuckle or the like.

A pulser ring 4 is fixedly mounted on one end face side of the inner ring 1 (on a side of the inner ring 1 opposite from the axial end of the drive shaft DS), and a seal 6 is fixedly mounted on one end face side of the outer ring 3 which corresponds to the one end face side of the inner ring 1. In addition, a pickup sensor 5 is disposed inwardly of the seal 6 so as to be opposed to the pulser ring 4. Moreover, a bearing seal 8 is mounted on the other end face side of the inner ring 1 and outer ring 3.

The seal 6 is constituted by a metal ring 61 that is fixed to the outer ring 3 at a proximal end thereof, and an annular rubber 62 that is mounted on a distal end of the metal ring 61. The metal ring 61 has on a side of a proximal end thereof a cylindrical portion 61a that is fixedly fitted over the outer circumferential surface of the outer ring 3, and a tapered portion 61b extending from the cylindrical portion 61a toward a side of a distal end of the metal ring in such a manner that the diameter thereof gradually decreases. The metal ring 61 further has a bent portion 61c formed at a distal end of the tapered portion 61b in such a manner as to protrude inwardly therefrom. The annular rubber 62 is fixedly mounted on an inner circumference of the bent portion 61c. This rubber 62 is brought into close contact with the outer circumferential surface of the drive shaft DS but permitted to slidably move with respect to the outer circumferential surface of the drive shaft DS.

The pickup sensor 5 is fixedly supported to the metal ring 61 via a carrier 7 that penetrates through and is fixed to the metal ring 61. The carrier 7 is formed into a pipe-like shape and a lead wire from the pickup sensor 5 is passed through the inside of the carrier 7 to be taken out of the device.

In this embodiment of the present invention, the pulser ring 4 and the pickup sensor 5 are both sealingly located within an annular space defined by the drive shaft DS, a bearing including the inner ring 1, the rolling members 2, the outer ring 3 and the bearing seal 8, and the seal 6. The external foreign matter never enter into the annular space. Further, since the end face of the bearing where the pulser ring is mounted is sealingly housed by the seal 6, there is no need to mount another bearing seal at that location.

Note that the present invention is not limited to the embodiment described above. For instance, any configuration or arrangement may be adopted as the metal ring 61 of the seal 6 as far as the proximal end of the metal ring is mounted on the fixed ring, and the distal end of the metal ring has the resilient material brought into a tight and slidable contact with the drive shaft DS so that the seal 6 as a whole creates a space for sealingly housing the pulser ring and the pickup sensor therein.

As has been described heretofore, according to the present invention, the arrangement is adopted in which the pulser ring fixed to the rotating ring side so as to rotate together with the wheel and the pickup sensor disposed so as to be opposed to the pulser ring are sealed by the seal that is mounted on the fixed ring at the proximal end thereof and that supports at the distal end thereof the resilient material such as a rubber which is brought into close contact with and slidable relative to the outer circumferential surface of the drive shaft. Consequently, the penetration of foreign matter from the outside into the portion where the pulser ring and the pickup sensor are mounted can be securely prevented, thereby making it possible to mitigate performance loss in detecting the number of rotations of a wheel of an automobile, which may be caused due to the adherence of such foreign matters to the pulser ring and the pickup sensor.

What is claimed is:

1. A wheel bearing device comprising:

an outer ring fixed to a vehicle body side;

an inner ring rotatably supported by said outer ring through rolling members and mounted on a drive shaft side so as to rotate together therewith;

a pulser ring fixedly mounted on one end face side of said inner ring; and a seal including a metal ring and an annular resilient member, a proximal end of said metal ring being fixedly mounted on one end face side of said outer ring corresponding to said one end face side of said inner ring, said annular resilient member being mounted on a distal end of said metal ring, wherein said pulser ring is encompassed by said seal, wherein said resilient member is in tight and slidable contact with an outer circumferential surface of a drive shaft, wherein a pickup sensor is supported by said metal ring to be opposed to said pulser ring, and wherein said metal ring comprises a bent portion formed at a distal end of a tapered portion.

2. The wheel bearing device according to claim 1, wherein said pulser ring and said pickup sensor are disposed within an annular sealed space defined by said outer ring, said rolling member, said inner ring, said drive shaft and said seal.

3. The wheel bearing device according to claim 1, wherein said proximal end of said metal ring has a cylindrical portion fixedly fitted over an outer circumference of said outer ring, and a portion of said metal ring extending from said proximal end to said distal end is conical.

4. The wheel bearing device according to claim 1, wherein said annular resilient member includes a rubber portion.

5. A wheel bearing device according to claim 1, wherein said seal is bridged between said outer ring and said outer circumferential surface of said drive shaft.

6. The wheel bearing device according to claim 1, wherein said pulser ring is fixedly mounted on an inner face side of said inner ring, said inner face side being opposite from an axial end of said drive shaft.

7. The wheel bearing device according to claim 1, wherein said pickup sensor is disposed inwardly of said seal in a position substantially opposed to said pulser ring.

8. The wheel bearing device according to claim 1, wherein said annular resilient member is fixedly mounted on an inner circumference of said bent portion.

9. The wheel bearing device according to claim 1, wherein said pulser ring comprises a magnetic material.

10. A wheel bearing device comprising:

an outer ring fixed to a vehicle body side;

an inner ring rotatably supported by said outer ring through rolling members and mounted on a drive shaft side so as to rotate together therewith;

a pulser ring fixedly mounted on one end face side of said inner ring; and a seal including a metal ring and an annular resilient member, a proximal end of said metal ring being fixedly mounted on one end face side of said outer ring corresponding to said one end face side of said inner ring, said annular resilient member being mounted on a distal end of said metal ring, said metal ring comprising a tapered portion such that a diameter gradually decreases along a length, wherein said pulser ring is encompassed by said seal, wherein said resilient member is in tight and slidable contact with an outer circumferential surface of a drive shaft, and wherein a pickup sensor is supported by said metal ring to be opposed to said pulser ring.

11. The wheel bearing device according to claim 10, wherein said pulser ring and said pickup sensor are disposed within an annular sealed space defined by said outer ring, said rolling member, said inner ring, said drive shaft and said seal.

12. The wheel bearing device according to claim 10, wherein said proximal end of said metal ring has a cylindrical portion fixedly fitted over an outer circumference of said outer ring, and a portion of said metal ring extending from said proximal end to said distal end is conical.

13. The wheel bearing device according to claim 10, wherein said annular resilient member includes a rubber portion.

14. The wheel bearing device according to claim 10, wherein said seal is bridged between said outer ring and said outer circumferential surface of said drive shaft.

15. The wheel bearing device according to claim 10, wherein said pulser ring is fixedly mounted on an inner face side of said inner ring, said inner face side being opposite from an axial end of said drive shaft.

16. The wheel bearing device according to claim 10, wherein said pickup sensor is disposed inwardly of said seal in a position substantially opposed to said pulser ring.

17. The wheel bearing device according to claim 10, wherein said metal ring comprises a bent portion formed at a distal end of said tapered portion.

18. The wheel bearing device according to claim 17, wherein said annular resilient member is fixedly mounted on an inner circumference of said bent portion.

19. The wheel bearing device according to claim 10, wherein said pulser ring comprises a magnetic material.

* * * * *